United States Patent [19]

Richards et al.

[11] 4,422,329

[45] Dec. 27, 1983

[54] APPARATUS AND METHOD FOR MEASURING CHANGES IN AMBIENT GRAVITY FIELDS

[75] Inventors: Christopher Richards, Arvada; Karl Pelegrin, Evergreen, both of Colo.

[73] Assignee: Delta-G Instruments, Inc., Evergreen, Colo.

[21] Appl. No.: 234,893

[22] Filed: Feb. 17, 1981

[51] Int. Cl.³ .............................................. G01V 7/08
[52] U.S. Cl. ................................................. 73/382 R
[58] Field of Search ...................... 73/382 R; 318/590; 307/400; 310/308, 309

[56] References Cited

U.S. PATENT DOCUMENTS

| | | | |
|---|---|---|---|
| 2,316,915 | 4/1943 | Truman | 73/382 |
| 2,322,681 | 6/1943 | Zenor | 73/382 R |
| 2,732,718 | 1/1956 | Cornelison | 73/382 R |
| 2,738,676 | 3/1956 | Worden et al. | 73/382 R |
| 3,245,263 | 4/1966 | Cornelison | 73/382 R |
| 3,713,088 | 1/1973 | Lehner et al. | 73/382 |

FOREIGN PATENT DOCUMENTS 451817  8/1936  United Kingdom ................. 73/382

OTHER PUBLICATIONS

"A New Gravimeter . . . " by Hedstrom, from Technical Publication 953, American Inst. of Mining & Metallurgical Engrs., 1938.
"Worden Gravity Meter Operating Instructions" by Texas Instruments, Jan. 1978.
"Geodetic Gravity Meter Model 'G'", La Coste +Romberg, 1956.
"Table–Synopsis of Capacitive Displacement Transducers" from Instruments & Control Systems, vol. 37, p. 80, Nov. 1964.

Primary Examiner—James J. Gill
Attorney, Agent, or Firm—Young & Martin

[57] ABSTRACT

A gravity meter is provided which has a support framework which supports a suspension system having a weight arm to which a reaction mass is attached. The reaction mass includes a dielectric mass which extends partially into a cavity between a pair of conductors. Changes in either the ambient gravitational field or the electric potential on the conductors causes the dielectric mass to be moved into or out of the cavity between the conductors allowing both fine tune calibration of the device by means of varying the electric potential and direct readout of the device by measuring the electric potential required to equilibrate the conductor and dielectric system. The suspension assembly includes a pair of parallel spindles rotatably mounted on hinges secured to the support framework with the spindles being interconnected by a zero length mainspring and temperature compensating framework. The weight arm is attached to a first one of the spindles and the second spindle is connected to a mechanical adjustment assembly for gross tune adjustment of the tensioning mechanism to calibrate the gravity meter to a pre-selected gravity range prior to fine tuning the gravity meter by means of varying the potential on the conductors.

21 Claims, 5 Drawing Figures

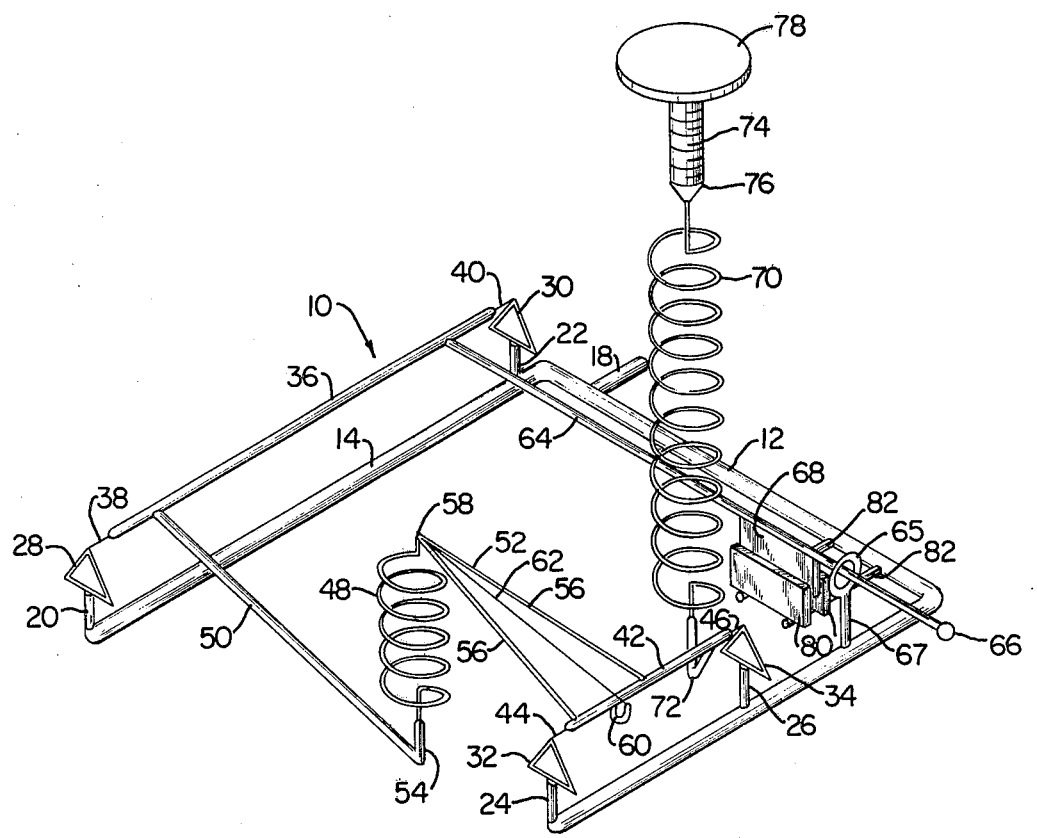
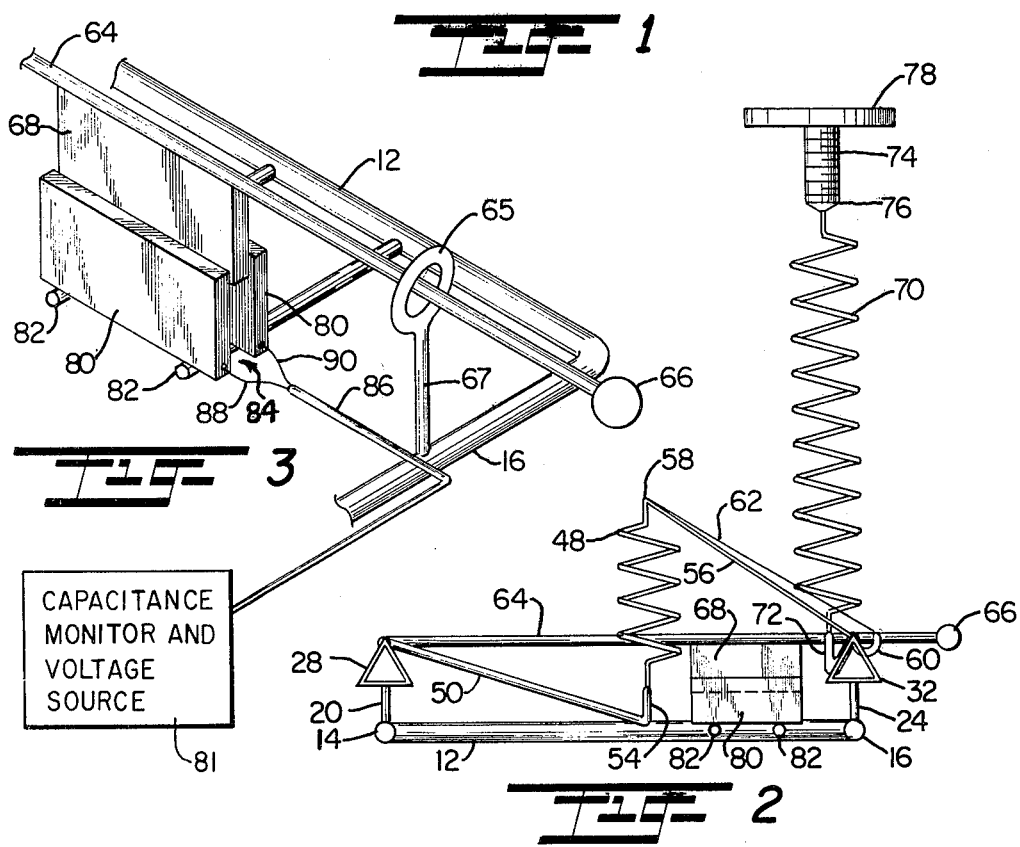

APPARATUS AND METHOD FOR MEASURING CHANGES IN AMBIENT GRAVITY FIELDS

BACKGROUND OF THE INVENTION

The present invention relates to gravity meters which detect changes in ambient gravitational fields as they are moved from one location to another or as the field varies with time. Particularly, the present invention is adapted to be utilized in measuring changes in the gravitational field surrounding a bore hole, for example, in the exploration for oil or other materials.

Geophysicists in particular have long been interested in the bulk measurement of rock densities in situ and one of the first measurements of this type utilized pendulum bases situated in vertical mine shafts. As more portable gravity meters became available, geophysicists recognized their potential in evaluating subsurface anomalies; extensive underground surveys were completed in the 1940's and 1950's which provided impetus for the development of a down hole gravity meter.

One of the early solutions to the problem of measuring changes in ambient gravitational fields was described in U.S. Pat. No. 2,607,487 issued to Worden, which utilized a weight or reaction mass disposed at one end of a pivotal horizonal arm. In the 1960's, several companies developed vibrating string gravity meters which were capable of accuracies of 0.1 milligals, but such devices only stimulated the desire for greater accuracy.

A major breakthrough in gravity meters designed for use in down hole or well bore applications came when LaCoste and Romberg developed a geodetic meter to operate inside a down hole sonde. In the mid 1970's, this meter was reduced in size such that it would be capable of surveying a 5½" casing while at the same time being capable of surveying a well bore having a deviation from the vertical as much as 14 degrees.

Typically, gravity meters of the type known utilize a weight disposed of one end of a horizontal weight arm with the other end of the arm being secured to a pivotal support. This weight arm is maintained at a desired reference position by a mainspring which is often secured to the end of a second support arm mounted to the frame of the instrument. The mainspring is selected to counteract the force of gravity acting on the weight arm over a specific range of gravity, and a mechanical adjustment system is attached to the support arm to balance the weight arm to a desired reference point. Once the instrument is nulled, a change in the ambient gravitational field between two observation stations or over time causes a displacement of the weight arm. Measurement of this displacement may be utilized to calculate the change in the gravitational field. Accordingly, the device operates on the principle of balancing the force of gravity by varying the force applied by the spring.

Notwithstanding these past developments, many problems have confronted both those who produced these gravity meters and those who utilize them in the field. For example, one difficulty stems from the need for a gravity meter which is both relatively small in size so that it may be operated internally of a well bore while at the same time being highly accurate to detect very slight changes in its ambient gravitational field. As well bores have gotten deeper, increased temperatures have affected the application of these meters.

Yet another problem confronts the use of these gravity meters which problem arises as a result of the world-wide variance in gravitational field. As noted, each of the devices operates within a range determined by the characteristics of its mainspring. The problem is that no mainspring has yet been capable of accurately responding to the full range of gravity variance encountered throughout the world while at the same time having suitable sensitivity for bore hole gravity measurements so that it thus becomes necessary to select a meter for use in each local area according to the gravity field range in that area. Users of these meters must therefore have several different meters to cover the complete range of gravity variance.

Another problem confronting these devices is the need for a readout system which will accurately reflect movement of the reaction mass so that the changes in the ambient gravitational field of the zone can be calculated from the magnitude of that movement. For example, in U.S. Pat. No. 3,245,263, issued to Cornelison, an optical readout system is disclosed. Generally, these optical readout systems, while functional, are susceptible to being dislocated or otherwise damaged while the gravity meter is in the well bore which can cause futher delays and expenses in measuring the gravitational field. LaCoste and Romberg developed a readout system based on a metal weight arm positioned between two conductor plates. A square wave signal is placed on each plate with the signals normally being 180 degrees out of phase. The position of the weight arm can be thus affected by a direct current signal placed on a selected one of the plates while the position of the weight arm is determinable from monitoring the resultant signal generated on the weight arm from the two square wave signals.

SUMMARY OF THE INVENTION

It is therefore an object of the present invention to provide an apparatus and method for obtaining a faster, more economical survey through the automatic nulling and readout of a gravity meter which may be accomplished while the meter is located within a well bore.

It is a further object of the present invention to provide a gravity meter which has a range of gravity measurement while will encompass the range of gravitational deviation over the entire surface of the earth.

Another object of the present invention is to provide a quartz element gravity sensor which incorporates uphole and downhole electronics to control automatically the nulling of the meter and to sense the output of the meter to allow calculation of the change in an ambient gravitational field at a remote location from the meter.

The gravity meter according to the present invention incorporates both a novel support and suspension system for a weight arm having a reaction mass mounted thereto and a unique nulling and sensor system which permits the remote pulling of the gravity meter and the remote sensing of the output data sufficient to enable calculation of changes in the ambient gravitational field about the meter. To this end, also, a new method is described for nulling the gravity meter to permit calculation and determination of the output thereof.

Specifically, in the preferred embodiment, the gravity meter is made of quartz elements which form the basic components of the system. First, a support framework is rigidly affixed inside a housing assembly or sonde, with this support framework mounting a suspension system which includes a pair of parallel, spaced-apart spindles extending between fiber or filament hinges. A first spindle mounts a weight arm which supports a reaction mass including, in part, a dielectric mass. The first and second spindles are interconnected by means of a support arm attached to the first spindle and a temperature conpensating arm attached to the second spindle with the ends of these arms being connected to opposite ends of a zero length mainspring. Torque may be applied to the first spindle by means of a mechanical adjustment through a tension spring or fiber so that this torque is adjustable to counteract the ambient gravitational force on the reaction mass. This gross mechanical adjustment allows the meter to be set to a desired range of operation.

The dielectric mass on the weight arm is positioned partially within a space formed between two conductors which, in the preferred embodiment, are in the form of a pair of spaced-apart, parallel plates. Suitable electric connections are made to these plates so that, as the electric potential on the plates is increased, the dielectric is drawn into the cavity between the conductors. These electric connections also permit the measuring of the change of electric capacitance of the conductor plates and dielectric system so that, by adjusting the electric potential so that there is no change in capacitance, a static force null position is obtained for the dielectric between the plates. This permits the remote nulling of the meter by means of adjusting the electric potential to zero the change in capacitance. Subsequent changes in the ambient gravitational field caused either by movement of the meter or by flux of the gravitational field over time will cause the reaction mass to move and thus will cause the dielectric to move between the conductors. Thus, the required change in the electric potential necessary to renull the system to a zero rate of capacitance change allows remote calculation of the change in the gravitational field.

Accordingly, the present invention, by utilizing this conductor and dielectric system, introduces a new parameter into the force equation. Whereas prior devices balanced the torque force due to gravity with the torque force of the mainspring, the present invention balances the gravitational force with the combined force of the mainspring and body force on the dielectric which is generated by the conductor and dielectric system. Rather than measuring changes in the ambient gravity field by mechanically torquing the mainspring to renull the meter as is the conventional practice, the present invention maintains the torque of the mainspring and simply alters the magnitude of this newly introduced body force.

The method according to the present invention thus incorporates the above described procedure. Specifically, the gravity meter is mechanically set to a preselected range of operation so that this range overlaps the extremes of the gravitational field of the zone desired to be measured. The setting of the range may be done either before the meter is extended or placed in this zone, such as, by lowering the gravity sonde down the well bore or in situ utilizing techniques known in the art. Once it is in place, the operator varies the electric potential on the conductor plates until a null state is obtained which corresponds to a lack of movement of the dielectric between the conductor plates. This null state or equilibrium is detected by monitoring the capacitance of the conductor and dielectric system to determine that there is no net change in capacitance.

The meter is then moved to the next site within the zone, and the operator renulls the device so that again there is no change in capacitance which corresponds to a lack of movement on the reaction mass and thus that a static force system has been obtained. The change in electric potential required to renull the system corresponds to the change in the gravitational field operating on the reaction mass connected to the weight arm.

These and other objects of the present invention will become more readily appreciated and understood from a consideration of the following detailed description of the preferred embodiment when taken together with the accompanying drawings, in which:

BRIEF DESCRIPTION OF THE DRAWINGS

FIG. 1 illustrates a gravity meter supension and framework assembly, in perspective, according to the preferred embodiment of the present invention;

FIG. 2 is a side view in elevation of the gravity meter shown in FIG. 1;

FIG. 3 is a perspective view of the conductor and dielectric nulling and readout system portion of the gravity meter shown in FIG. 1;

DETAILED DESCRIPTION OF THE PREFERRED EMBODIMENT

Figure 5:
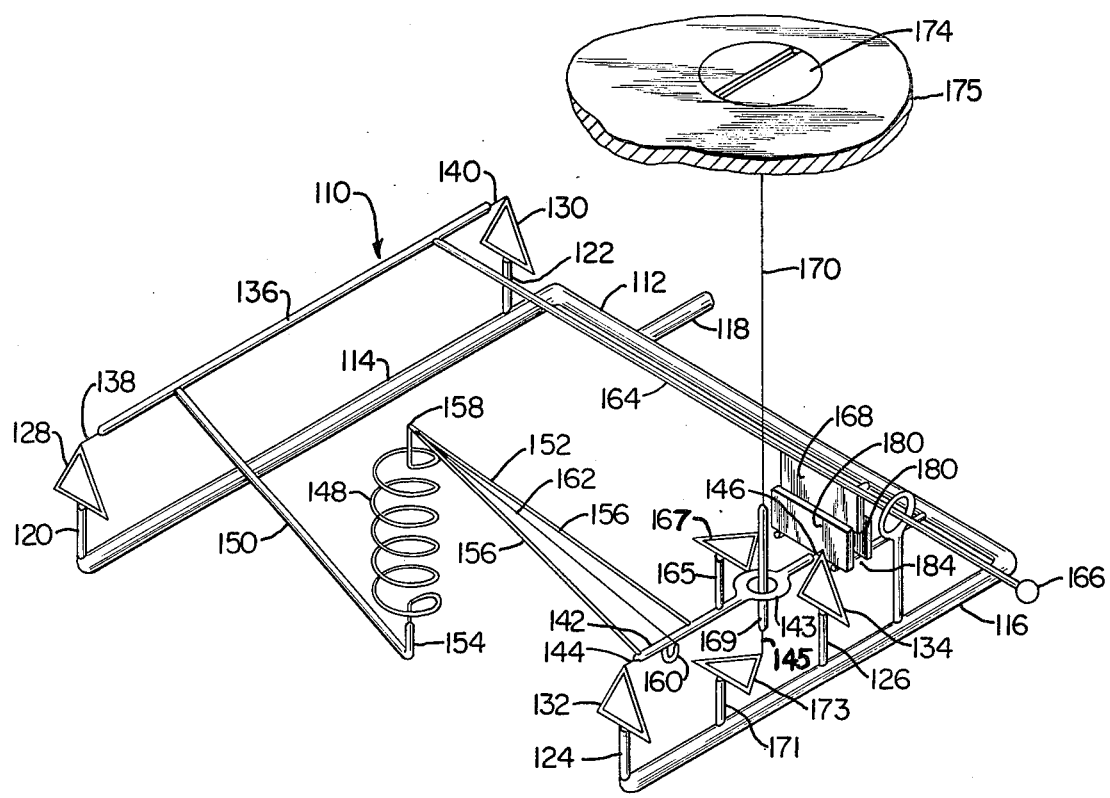
FIG. 5 is a perspective view of a support framework and suspension system of an alternate embodiment of the gravity meter according to the present invention.

The present invention is directed to a gravity meter capable of accurately measuring changes in an ambient gravitational field and a novel method for making these measurements. The user of the preferred embodiment of the present invention may calibrate or fine tune the gravity meter at a remote location, and the user may also receive the output of the meter from this remote location in order to calculate changes in the ambient gravitational field which can occur either through movement of the device or through gravitational flux over a period of time. This remote operation can be achieved by utilizing conventional capacitance measuring and voltage source devices, commonly known in the field of electrical measurement, in conjunction with the structure and method according to the preferred embodiment of the present invention.

The preferred embodiment of gravity meter 10 is shown in FIGS. 1 and 3 and generally comprises a support framework adapted to be rigidly attached to a module or sonde (not shown) which acts as a housing assembly for the gravity meter. This sonde may be in the form of a capsule adapted to be inserted, along with other instrumentation, down a well bore, such as an oil well hole. All of the main elements of gravity meter 10 are formed out of quartz, with support framework being defined by quartz bars 12, 14 and 16 mounted in a generally U-shaped configuration with a smaller bar 18 extending outwardly from bar 12 to be attached in some conventional manner to the housing assembly so that the support framework is rigidly mounted thereto. Posts 20 and 22 extend upwardly from bar 14, and triangular members 28 and 30 are mounted at the upper ends respectively to posts 20 and 22. Posts 24 and 26 extend vertically upwardly from bar 16 with post 26 located along the mid-portion thereof. Post 24 mounts a triangular member 32 and post 26 mounts triangular member 34 at the upper end thereof. Triangular members 28, 30, 32 and 34 are each mounted on a respective post along a mid-portion of one of the sides so that the remaining two sides converge upwardly to an apex. This structure, then, defines the support framework for the suspension assembly forming the operating mechanism of gravity meter 10.

The suspension assembly includes a beam spindle 36 which is mounted at opposite ends to triangle member 28 and 30 by means of filament hinges 38 and 40. A reset spindle 42, in a similar manner, is mounted between triangle members 32 and 34 by means of filament hinges 44 and 46. Spindles 36 and 42 are generally parallel to one another and lie in a plane which is generally parallel to the plane of bars 12, 14 and 16.

Beam spindle 36 is interconnected with reset spindle 42 by means of a zero length mainspring 48, a lower mainspring arm 50, and a mainspring support frame member 52. Specifically, lower mainspring arm 50 extends radially outwardly from beam spindle 36 in a direction generally toward spindle 42 and terminates in an upturned foot 54 which is connected to one end of mainspring 48. Mainspring support frame member 52 has a generally V-shaped configuration, being formed of a pair of legs 56 which are connected at one end to spindle 42 in spaced relation to one another and which converge to a point or apex 58 which is connected to the opposite end of mainspring 48. Legs 56 thus form a temperature compensation framework which is completed by the addition of a J-shaped curved finger 60 connected to spindle 42 between the ends of legs 56 and a tungsten filament 62 which extends from the end of finger 60 to apex 58.

A weight arm or beam 64 is attached to beam spindle 36 at an end thereof adjacent triangular support member 30 with beam 64 extending radially outwardly from beam spindle 36 generally in the plane of spindles 36 and 42. Beam 64 terminates in a round ball or mass 66 and supports along a mid-portion a dielectric mass 68 which is in the form of a downwardly extending rectangular plate 68. The purpose and function of dielectric plate 68 will be described below in greater detail. Further, as shown in FIG. 3, an eye member 65, surrounds beam 64 near ball 66 with eye member 65 being supported by a post 67 connected to bar 16. Post 67 and eye member 65 act as limit stop for beam 64 to prevent it from exceeding a desired magnitude of movement to avoid mechanical damage to the apparatus.

A gross tune or adjustment mechanism is provided by means of reset spring 70 which is connected at one end to reset spindle 42 by means of a V-shaped reset arm 72 which is rigidly attached at one end thereof to spindle 42 and at the other end to spring 70. A reset screw 74 has a shank 76 connected to the opposite end of reset spring 70 and a head 78 which is provided with any convenient indexing means. Further, reset screw 74 is mounted in any convenient manner to the housing assembly or module for gravity meter 10 so that the rotation of reset screw 74 places torque on spring 70 which provides a gross calibration of gravity meter 10 to define a gravity range for measurement as described below. Specifically, torque on spring 70 is passed through reset arm 72 to operate on reset spindle 42 which in turn adjusts the force on mainspring 48 through support frame member 52. The force of mainspring 48 then adjusts the position of beam 64 by operating on beam spindle 36.

Gravity meter 10 is completed by means of a pair of conductor plates 80 which are supported by means of rods 82 extending outwardly from bar 12 as shown in FIGS. 1 and 3. Conductor plates 80 are in a spaced-apart relation to define a space or cavity 84 therebetween. As shown in FIG. 3, wire 86 has leads 88 and 90 connected to respective ones of plates 80 so that an electric potential may be placed on plates 80 and electronic measurement of the capacitance of plates 80 may be accomplished by any suitable device or combination of devices available in the art as represented by capacitance monitor and voltage source 81 in FIG. 3. Dielectric plate 68 has a common length and width with plates 80 and extends partially into the cavity 84 between plates 80 as is shown in FIG. 3, and the usefulness of this arrangement is described below. Cavity 84 is thus dimensioned to be slightly wider than the thickness of dielectric plate 68.

Figure 4:
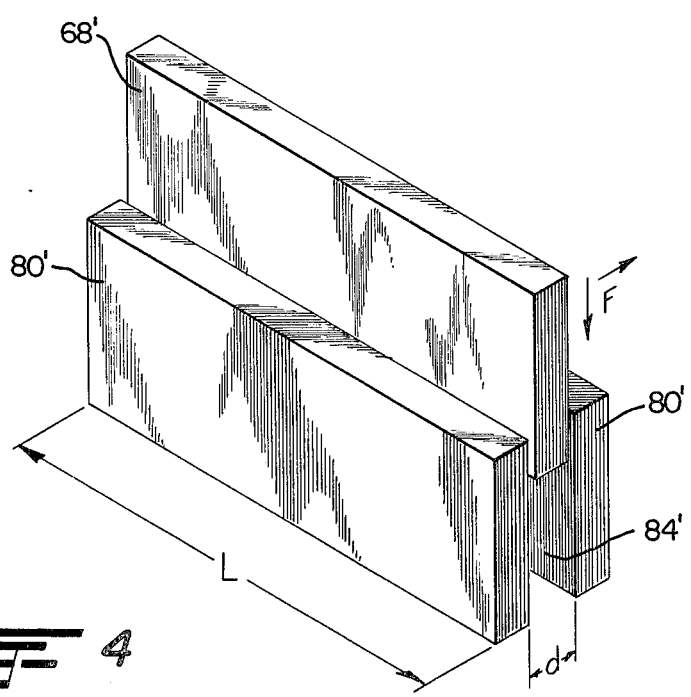
FIG. 4 is a diagrammatic view of a parallel plate capacitor.

As noted above, gross tune adjustment or calibration of gravity member 10 is accomplished by means of screw 74 and reset spring 70. Fine tune adjustment is accomplished by means of conductor plates 80 and dielectric plate 68. Referring to FIG. 4, a capacitor system is diagramatically shown being defined by conductor plates 80' and a dielectric plate or slab 68' The conductor plates 80' and the dielectric slab 68' have a length of L with conductor plates 80' being separated by a distance d to define a cavity 84' therebetween. By applying an electric potential between plates 80', a "body force" is generated which tends to draw dielectric slab 86' into cavity 84' because such positioning would reduce the total energy of the system. An explanation of the physics of this system may be found in Cheston, Elementary Theory of Electric and Magnetic Fields, 119–131 (1974 John Wiley & Sons, Inc.). Specifically, ignoring the edge effects of the electric field, the force applied to dielectric slab 68' varies with the square of the potential applied to the conductor plates, with the equation being expressed as follows:

$$F = \tfrac{1}{2}\epsilon_o L V^2 (K-1)/d$$

wherein:
F = body force
$\epsilon_o$ = permativity constant
L = length of the conductor plate
V = electric potential K = dielectric constant of the slab
d = distance between the conductor plates This body force, then, may be used to balance or null the gravity meter once it is in position. Specifically, after setting the range or gross tuning of the instrument by means of screw 74 and spring 70, the device can be lowered into a bore hole to a desired zone and can then be fine tuned by varying the electric potential on conductor plates 80 so that a null condition is established.

In former devices, gravity measurement was accomplished by balancing the force of gravity with the restoring force of the mainspring, such as mainspring 48. The general equation for the torque, $T_g$, due to gravity and the torque $T_s$ due to the mainspring are:

$$T_g = g \cdot c \cdot m \sin \beta$$

$$T_s = k \cdot a \cdot b \sin \alpha$$

where:
g = gravitational acceleration
c = distance between pivot point of weight arm and its center of mass m = total mass of the weight arm
k = spring constant
a = distance between pivot point of weight arm and position of mainspring (point 58)
b = distance between pivot point of weight arm and bottom of mainspring
$\beta$ = angle between distance line c and g
$\alpha$ = angle between distance line a and b A nulled condition is present when $T_g = T_s$, where $T_g$ is the effective torque on the weight arm caused by the gravitational field and $T_s$ is the effective torque of the mainspring on the weight arm. These torques are dependent on various angles interrelating to the weight arm, the center of mass moment and the mainspring, which, as is known in the art, can be made to cancel out of the general equation by selecting the correct geometry for the system. A more detailed understanding of this torque equation may be gained from L. L. Nettleton, *Gravity and Magnetics in Oil Prospecting* (McGraw-Hill 1976).

The present invention introduces a third parameter, $T_e$, into this equation, with the parameter being the torque generated by the body force when a potential is placed on conductors 80. As noted, such potential creates force tending to draw dielectric plate 68 into cavity 84. A null condition is thus established when:

$$T_g = T_s - T_e$$

Accordingly, when the present invention is operated, a first null condition is established wherein these forces are balanced. The device is then moved to a second location and renulled. Since $T_s$ is held constant, the change in $T_g$ is directly proportional to the change in $T_e$ required to maintain the renulled condition. $T_e$ in turn is directly proportional to the electric potential placed on conductors 80, so that, by measuring the change in potential necessary to have a nulled condition at two different locations, or over a period of time, the change in the torque caused by gravity, and thus the change in gravitational field can be calculated according to standard physical equations. As described below, the null condition is detected by monitoring the capacitance of the conductor and dielectric mass system.

Specifically, the null condition is established when there is no net change in the capacitance of the system over time since $T_g$ would then be equal to $T_s - T_e$. If the torque forces are not in balance, there would be a net movement of beam 64 which would cause dielectric plate 68 to move within cavity 84. Movement of dielectric plate 68 would cause a change in the capacitance of the conductor and dielectric plate system. Thus, when the capacitance is constant, the system is nulled. Any change in the ambient gravitational field then causes the equilibrium condition to be upset and results in movement of beam 64 and the dielectric plate 68 between conductors 80, which in turn causes the capacitance of the capacitor defined by conductors 80 and dielectric plate 68 to vary with time. Renulling the system then stabilizes beam 64 and dielectric plate 68 to permit calculation of the new gravitational field by measuring the new potential on conductors 80.

All of the above measurements and calculations may be performed remotely of the instrument, with the only connection to the device being a two wire electrical connection. The gravity meter may thus be calibrated or nulled quickly and without mechanical deadplay or error over a wide range while maintaining extreme sensitivity in the reading of gravitational field.

The method of the present invention requires that the device be positioned at a first location and then renulled. Nulling the device is accomplished by varying the electric potential on conductors 80 until $T_g = T_s - T_e$, which condition is detected by determining that beam 64 and dielectric plate 68 have a stabilized position. Such null condition is detected by monitoring the capacitance of conductors 80 and dielectric plate 68 since movement of dielectric plate 68 will cause a change in the capacitance value of conductors 80. When the capacitance is stabilized there is no net movement of dielectric plate 68 or beam 64. The device is then moved to a second location, and the device is renulled in the manner set forth above. The nulling and renulling can be made with the weight arm at different positional locations, but in typical operation, the measurement would take place at a single positional location which could be detected by the magnitude of the capacitance of the system of conductors 80 and plate 68. The change in the electric potential required to renull the system corresponds to the change in the gravity field since $T_g$ is proportional to $T_e - T_s$. Accordingly, there is no need to calculate the capacitance of the system to measure the gravity field, but rather it is only necessary to ensure that the capacitance is stabilized at each location. However, it is important in conducting the measurements that the operator be able to determine whether the beam 64 is against the limit stop formed by eye member 65 and post 67. If beam 64 is against the limit stop, a user might misinterpret its lack of motion for an equilibrated condition wherein the forces are in balance. Accordingly, a measurement of capacitance permits determination that there is mechanical restraint of the system by the limit stop with there being boundary capacitance values corresponding to the limits within which the device is operable. Of course, in the above example, where one is measuring the change in gravity over a period of time, the device is not moved. The gravitational change is determined by renulling the device after a lapse of time at the same location, but the basic technique remains the same.

An alternate embodiment of the present invention is shown in FIG. 5, and, while it is of substantially the same construction as that described with respect to the preferred embodiment, it departs therefrom in the construction of the gross tune adjustment mechanism. As is shown in FIG. 5, a support framework comprising bars 112, 114 and 116 are formed in a generally U-shaped configuration and attached to the housing of gravity meter 110 by means of bar 118. Posts 120 and 122 extend upwardly from bar 114 and mount respectively triangular members 128 and 130. Posts 124 and 126 extend upwardly from bar 116 and respectively support triangular members 132 and 134. Beam spindle 136 is suspended by means of hinges 138 and 140 between triangular members 128 and 130 with beam spindle 136 supporting a beam 164 extending radially outwardly therefrom and which beam terminates in a ball or mass 166. Beam 164 supports dielectric mass or plate 168 in a manner similar to that described with respect to the preferred embodiment.

Reset spindle 142 is mounted between triangular members 132 and 134 by means of hinges 144 and 146 with spindle 142 having an annular eye 143 having a circular opening with eye formed at a mid-portion of spindle 142. Spindles 136 and 142 are interconnected by means of a lower mainspring arm extending outwardly from spindle 136 and a mainspring support frame member 152 formed of a pair of legs 156 which are connected in spaced-apart relation on spindle 142 and which converge to an apex 158. A mainspring 148 is connected at one end to apex 158 and at the opposite end to upturned foot 154 of lower mainspring arm 150. A curved finger 160 is connected to spindle 142 between the end of finger 160 and apex 158. A pair of conductor plates 180 are mounted in a manner similar to that described with respect to the preferred embodiment and form a cavity 184 therebetween, and dielectric 168 is positioned so that it extends partially within cavity 184.

The gross tune mechanism according to the alternate embodiment of the present invention departs somewhat from that described with respect to the preferred embodiment. Specifically, as is shown in FIG. 5, upright post 171 is attached to bar 116 between posts 124 and 126 with post 171 supporting a triangular support 173 which is oriented in a plane generally parallel to the plane defined by bars 112, 114 and 116. A second upright post 165 is attached at a mid-portion of spindle 142 with post 165 supporting a triangular support member 167 in a generally parallel relationship to triangular support 173. A rod 169 is attached at one end to support 167 and at its opposite end to a hinge 145 which is connected in turn to triangular support 173. A torsion fiber extends between the end of rod 169 opposite hinge 145 and a screw 174 which is mounted in housing 175 for gravity meter 110. Accordingly, adjustment of screw 174 places torque on torsion fiber 170 which causes torque to be generated through triangular support 167 and post 165 so that this torque is translated to spindle 142 and thus to mainspring 148. This in turn places torque on beam spindle 136 to cause pivotal movement of beam 164 thereby adjusting the orientation of beam 164 and the reaction mass defined by ball 166 and dielectric plate 180.

Although the present invention has been described with particularity relative to the foregoing detailed description of the preferred embodiment, various modifications, changes, additions and applications other than those specifically mentioned herein will be readily apparent to those having normal skill in the art without departing from the spirit and scope of this invention.

We claim:

1. In a gravity meter mounted to a rigid framework and having a reaction mass mounted on a weight beam coupled to a suspension system whereby said beam is movable in response to changes in the ambient gravitational field, the improvement comprising a nulling and position sensor assembly including a dielectric mass and a pair of spaced-apart conductors, one of said dielectric mass and said pair of conductors being rigidly secured to said weight beam for movement in a first plane parallel to the plane of movement of said weight beam and the other of said dielectric mass and said pair of conductors being rigidly and immovably secured to said framework, said conductors having a cavity therebetween and oriented in places parallel to and on either side of said first plane and a portion of said dielectric mass extending into said cavity, movement of said beam causing corresponding transverse movement of said dielectric in said first plane and into and out of said cavity, means connected to said condutors conductors for varying the electric potential therebetween, and means connected to said conductors for measuring the capacitance thereof.

2. In a gravity meter according to claim 1 wherein said dielectric mass and said conductors are flat plates, said conductors being oriented in parallel spaced-apart relation to one another.

3. In a gravity meter according to claim 1 wherein said dielectric mass is secured to said beam and defines part of said reaction mass, said conductors being secured to said framework.

4. A gravity meter for measuring changes in ambient gravitational fields, comprising:
a housing assembly;
a support framework mounted to said housing assembly;
a first pair of hinge members supporting a first spindle on opposite ends thereof in spaced relation to said framework, said first spindle being rotatably mounted between said first pair of hinge members along a first axis;
a second pair of hinge members supporting a second spindle on opposite ends thereof in spaced relation to said framework, said second spindle being rotatably mounted between said second pair of hinge members along a second axis substantially parallel to said first axis, said second spindle including an eye portion having a circular opening;
a weight arm attached to said first spindle and extending radially outward therefrom, said weight arm supporting a reaction mass;
a mainspring arm attached to and extending radially outwardly from said first spindle in a direction generally toward said second spindle;
a mainspring support framework attached to and extending radially outwardly from said second spindle;
a mainspring interconnecting the free ends of said mainspring arm and said mainspring support frame member; and
adjustment means connected to said second spindle for applying adjustable torque to said second spindle, said adjustment means including a torque rod extending through said circular opening and rotatably hinged at one end to said support framework and attached at an opposite end to said second spindle, said adjustment means further including a torsion fiber connected at a first end to said opposite end of said torque rod and at a second end to a adjustment screw mounted for rotation on said housing assembly.

5. A gravity meter according to claim 4 including a stop limit means secured to said framework for limiting the movement of said weight arm.

6. A gravity meter according to claim 5 wherein said stop limit means includes an upright post attached to said support framework and an eye member rigidly mounted on said upright post, said eye member encircling said weight arm.

7. A gravity meter according to claim 4 wherein said adjustment means includes a spring element connected at one end to said second spindle and at an opposite end to an adjustment screw mounted for rotation on said housing assembly.

8. A gravity meter according to claim 4 wherein said mainspring is a zero length spring element.

9. A gravity meter according to claim 4 wherein said mainspring support frame member includes a pair of legs connected in spaced relation to said second spindle and extending outwardly therefrom and converging to an apex, said mainspring being connected to said support frame element at said apex, and a curved finger having a first end secured to said second spindle midway between said legs and a second end connected to a wire member extending from said apex.

10. A gravity meter according to claim 9 wherein said wire member is constructed of tungsten.

11. A gravity meter according to claim 4 including a pair of spaced-apart conductors having a cavity therebetween and wherein said reaction mass includes a portion formed of a dielectric material, said conductors being mounted on said support framework adjacent said weight arm and a portion of said dielectric mass extending into said cavity whereby movement of said weight arm causes corresponding movement of said dielectric mass into and out of said cavity.

12. A gravity meter according to claim 11 further including means associated with said conductors for applying a variable electric potential thereto and sensor means associated with said conductors for sensing the capacitance thereof.

13. A gravity meter according to claim 4 including second adjustment means associated with said weight arm for adjustably positioning said weight arm and sensor means associated with said weight arm for detecting the position thereof.

14. A gravity meter according to claim 4 wherein said first and second pair of hinge members are quartz fiber elements.

15. In a gravity meter adapted for reading changes in an ambient gravitational field and having a support framework and weight arm including a dielectric mass coupled thereto, said weight arm movably coupled to a suspension system, and a pair of spaced-apart conductors mounted adjacent said dielectric mass, the method of adjusting and reading said meter comprising the steps of:

positioning the gravity meter at a first location;

nulling the meter to a first equilibrium state by applying an electric potential to said conductors whereby said weight arm is made motionless;

exposing the meter to a change in gravitational field;

renulling the meter to a second equilibrium state by varying the electric potential on said conductors whereby said weight arm is again made motionless; and measuring the change in electric potential between said first and second equilibrium states.

16. The method according to claim 15 wherein said meter is exposed to a change in gravitational field by moving the meter to a second location.

17. The method according to claim 15 wherein said meter is exposed to a change in gravitational field by allowing a time lapse between said nulling and said renulling at said first location.

18. The method according to claim 15 wherein said first and second equilibrium states are detected by monitoring the capacitance of said conductors.

19. The method according to claim 18 wherein said nulling and renulliing steps are accomplished by varying the electric potential on said conductors until the capacitance of said conductors ceases to change with respect to time.

20. The method according to claim 18 further including the step of monitoring the capacitance to determine that the value thereof falls within a pre-selected range.

21. The method according to claim 15 wherein said nulling and renulling steps are accomplished by positioning said weight arm at the same orientation during each of said nulling and renulling steps.

* * * * *